(12) United States Patent
Yurgevich

(10) Patent No.: US 7,527,325 B2
(45) Date of Patent: May 5, 2009

(54) CARGO CONTAINER WITH PERIPHERAL WALL STRUCTURE REINFORCED BY SIDE POST ASSEMBLIES

(75) Inventor: Howard Yurgevich, Chula Vista, CA (US)

(73) Assignee: Hyundai Translead, San Diego, CA (US)

( * ) Notice: Subject to any disclaimer, the term of this patent is extended or adjusted under 35 U.S.C. 154(b) by 43 days.

(21) Appl. No.: 11/707,529

(22) Filed: Feb. 16, 2007

(65) Prior Publication Data

US 2008/0197671 A1 Aug. 21, 2008

(51) Int. Cl.
*B00J 5/00* (2006.01)

(52) U.S. Cl. .................................... 296/186.1

(58) Field of Classification Search ............. 296/186.1, 296/186.2, 181.3, 181.2, 191; 52/590.1, 52/590.2, 589.1, 591.1, 578, 588.1, 582.1
See application file for complete search history.

(56) References Cited

U.S. PATENT DOCUMENTS

| | | | |
|---|---|---|---|
| 3,917,338 A * | 11/1975 | Becker | 410/116 |
| 4,810,027 A | 3/1989 | Ehrlich | |
| 5,058,756 A | 10/1991 | Green | |
| 5,066,066 A | 11/1991 | Yurgevich | |
| 5,439,266 A | 8/1995 | Ehrlich | |
| 5,584,252 A | 12/1996 | Smith et al. | |
| 5,997,076 A * | 12/1999 | Ehrlich | 296/186.1 |
| 6,003,932 A | 12/1999 | Banerjea et al. | |
| 6,497,451 B1 * | 12/2002 | Jones et al. | 296/186.1 |
| 6,527,335 B1 | 3/2003 | Yurgevich | |
| 6,607,237 B1 * | 8/2003 | Graaff et al. | 296/186.1 |
| 6,652,018 B2 * | 11/2003 | Buchholz et al. | 296/186.1 |
| 6,652,019 B1 | 11/2003 | Bennett | |
| 6,832,808 B1 | 12/2004 | Bennett | |
| 6,871,903 B2 * | 3/2005 | Taguchi et al. | 296/181.6 |
| 6,893,075 B2 * | 5/2005 | Fenton et al. | 296/181.1 |
| 6,959,959 B1 | 11/2005 | Roush | |
| 7,066,529 B2 * | 6/2006 | Yurgevich et al. | 296/186.1 |
| 7,100,971 B2 * | 9/2006 | Pines | 296/186.1 |
| 2002/0101095 A1 | 8/2002 | Gosselin et al. | |
| 2005/0161977 A1 | 7/2005 | Fenton et al. | |

* cited by examiner

*Primary Examiner*—Kiran B. Patel
(74) *Attorney, Agent, or Firm*—Wood, Phillips, Katz, Clark & Mortimer

(57) ABSTRACT

A cargo container having a floor and a peripheral wall structure extending upwardly from the floor and bounding a cargo storage space. The peripheral wall structure includes a plurality of side post assemblies. The peripheral wall structure further has a plurality of panels each having an inside surface facing the cargo storage space and an oppositely facing outside surface. Each of a plurality of side post assemblies has a body with a vertically extending length and a "U" shape as viewed in cross section taken transversely to the length of the body. Each side post assembly is secured to at least one of the panels and has: a) a base with a width; b) first and second legs projecting respectively from the first and second base ends; and c) first and second flanges projecting laterally oppositely respectively from the first and second legs. Each side post assembly further has a reinforcement plate that is secured to the base to reinforce the base.

24 Claims, 10 Drawing Sheets

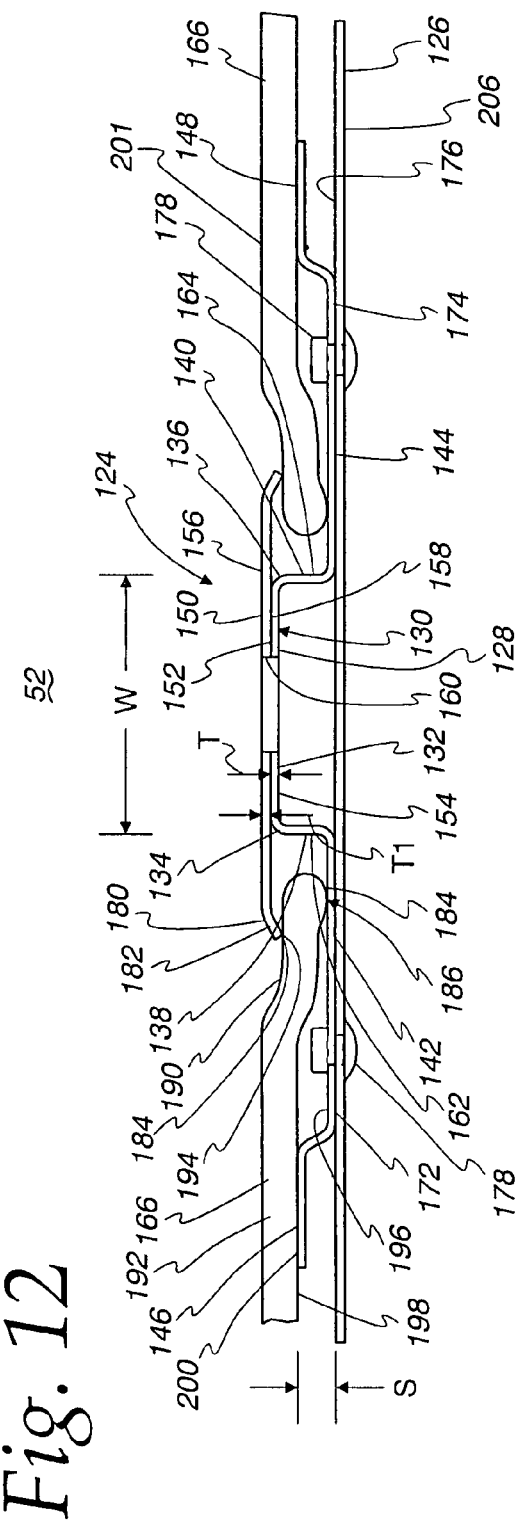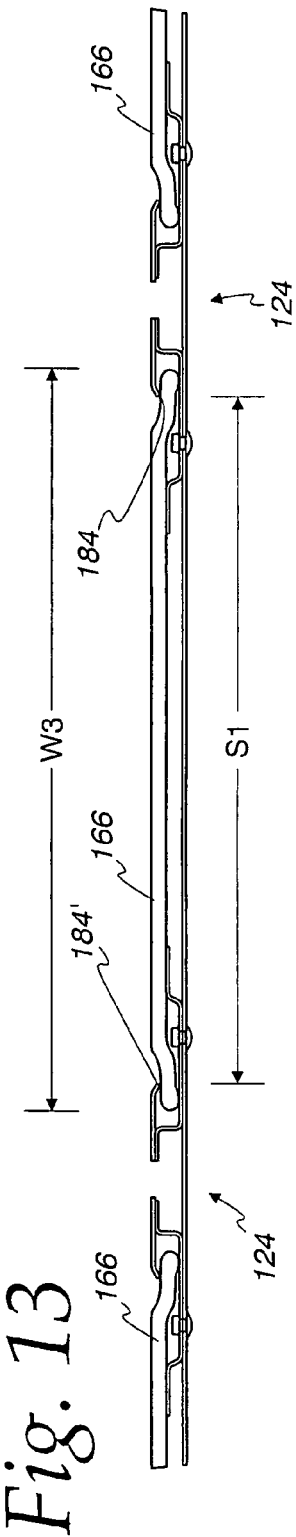

US 7,527,325 B2

CARGO CONTAINER WITH PERIPHERAL WALL STRUCTURE REINFORCED BY SIDE POST ASSEMBLIES

BACKGROUND OF THE INVENTION

1. Field of the Invention

This invention relates to cargo carrying containers and, more particularly, to a cargo carrying container with a peripheral wall structure that extends around a cargo storage space and has panels that are reinforced by side post assemblies.

2. Background Art

Over the years, a multitude of designs have been developed for peripheral wall structures on cargo carrying containers, for either single, or multi-model applications. Designers of these cargo carrying containers seek to optimize the volume of the cargo storage space within the constraints imposed by governmental agencies that regulate this industry. This space maximization must not be carried out so as to significantly compromise the integrity of the cargo container. The peripheral wall structures must be designed to withstand vertical, transverse and lateral loading forces that may be encountered in many different environments and under many different conditions.

It is well known to construct a cargo container with a peripheral wall structure between upper and lower rail assemblies to produce a cubicle cargo space. The upper and lower rail assemblies are respectively integrated into roof and floor assemblies and tend to maintain the overall squared shape of the cargo container.

In use, the cargo container is subjected to a number of different static and dynamic forces. The weight of the roof assembly is borne by the peripheral wall structure. In the event that the cargo container is mobilized through a wheeled carriage or provided with a support, as for cooperating with a rail car, loading is imparted through the carriage, a coupler assembly for drawing the cargo container and landing gear aft of the coupler assembly, and through any frame designed for support upon a rail car.

In addition to the aforementioned vertical loads, non-vertical loading forces are imparted to the peripheral wall structure by wind, shifting of cargo, and bending/distortion as the cargo container is transported, be it upon its own carriage or upon a rail car. Additionally, non-vertical forces are imparted by reason of applying anchoring forces through the peripheral wall structure to the cargo within the storage space, to prevent shifting thereof.

It is well known to construct peripheral wall structures with a plurality of flat panels, joined edge-to-edge, or in lapped relationship, to produce a continuous shape. At regularly spaced intervals, including at locations at which the panel edges are butted or lapped, vertically extending, elongate side post assemblies are utilized. Commonly, the side post assemblies are made from steel sheet material that is formed to produce a generally "U" shape defined by a base and spaced, parallel legs. The legs have outturned flanges through which the side post assemblies are secured to one or more panels at strategically selected locations.

The nature of the wall panels, the side post assemblies, and their interaction, dictates the overall strength and integrity of the peripheral wall structure. The depth of the side post assemblies also determines in good part the degree of their rigidity and ability to resist flexing under loading. Generally, the deeper the "U", the more resistant the side post assemblies are to bending. However, by increasing the depth of the side posts, the cargo space is reduced correspondingly. At the spaced side walls, the loss of volume due to this increase in depth is doubled.

Consequently, it is preferred to make the depth of the "U" as small as possible without adversely compromising integrity. The loss of strength due to the reduced depth can be compensated for to a certain extent by increasing the strength of the material making up the side post assemblies and the panels. While increasing the thickness of the panels and side post assemblies does add strength, it also adds weight to the overall container, which translates into lost revenue by reason of increased loading on the towing equipment and thereby increased fuel consumption.

Thus, the industry had devised numerous different configurations of side post assemblies that potentially allow lighter gauge materials to be used for the side post assemblies and panels. This reduction in material gauge, while desirable from a weight reduction standpoint, introduces additional complications.

For example, the base of the "U" on the side post assemblies commonly serves as a location for discrete logistic slots used for components that effect bracing and allow cargo control by reason of limiting shifting thereof within the storage space. A base that is relatively thin may be prone to failure under forces applied through mechanisms directed through the logistics slots and braced against the base. This balance between weight control and strength for logistics slots has lead designers in many cases to use a gauge of material that is heavier than desired but one that will adequately resist failure in the region around the logistic slots. It may be that in such a case the overall weight of the side post assembly is greater than optimal and the strength of the base in the vicinity of the logistic slots is less than optimal.

The industry continues to seek out new designs of side post assemblies that produce an effective balance between strength, weight control, and maximization of storage space.

SUMMARY OF THE INVENTION

In one form, the invention is directed to a cargo container having a floor and a peripheral wall structure extending upwardly from the floor and bounding a cargo storage space. The peripheral wall structure includes a plurality of side post assemblies. The peripheral wall structure further has a plurality of panels each having an inside surface facing the cargo storage space and an oppositely facing outside surface. Each side post assembly has a body with a vertically extending length and a "U" shape as viewed in cross section taken transversely to the length of the body. Each side post assembly is secured to at least one of the panels and has: a) a base with a width between laterally spaced first and second ends; b) first and second legs projecting respectively from the first and second base ends; and c) first and second flanges projecting laterally oppositely respectively from the first and second legs. The base and first and second legs cooperatively define the "U" shape. Each side post assembly further has a reinforcement plate that extends over a substantial portion of the width of the base and is secured to the base so as to reinforce the base.

In one form, a logistics slot is formed at a first location on one of the side post assemblies through each of the base and reinforcement plate on the one side post assembly.

In one form, the reinforcement plate on each of the side post assemblies projects laterally to beyond the first leg to bound in conjunction with the first leg a first laterally opening receptacle for a first liner panel.

In one form, the first laterally opening receptacle is bounded by at least one of: a) the at least one panel; and b) the first flange.

A single piece may define the base, the first and second legs, and the first and second flanges.

The single piece may be a formed metal sheet.

In one form, the base has a first flat layer with a flat first surface facing into the cargo storage space and a flat second surface facing oppositely to the first surface. The flat first layer has a substantially uniform first thickness. The reinforcement plate is in the form of a second flat layer with a substantially uniform second thickness. The reinforcement plate has a flat third surface that is facially abutted to the flat first surface.

In one form, the reinforcement plate projects laterally oppositely to beyond each of the first and second legs to: a) bound in conjunction with the first leg a first laterally opening receptacle for a first liner panel; and b) bound in conjunction with the second leg a second laterally opening receptacle for a second liner panel.

The reinforcement plate in one form has laterally spaced ends that are each bent outwardly towards the at least one panel.

The first and second thicknesses may each be on the order of 16 to 18 gauge.

In one form, the first and second flanges are secured to the inside surface of the at least one panel so that the "U" shape opens towards the at least one panel.

The cargo container may be provided in combination with a first liner panel that is directed into the first laterally opening receptacle.

In one form, the reinforcement plate is secured to the base by one of: a) welding; and b) discrete, securable fasteners.

In one form, the first flange is secured to the at least one panel and has a lateral end that is offset from the at least one panel to support a part of the first liner panel a predetermined distance away from the at least one panel.

The reinforcement plate preferably extends over a substantial length of the base. In one form, the reinforcement plate extends over substantially the entire length of the base.

The first and second flanges may be secured to the inside surface of the at least one panel by a plurality of discrete, securable fasteners.

In one form, the inside surface of the at least one panel resides substantially in a plane that is substantially parallel to the first, second and third surfaces.

A plurality of vertically spaced logistics slots may be formed in one of the side post assemblies.

In one form, the reinforcement layer has a fourth surface facing oppositely to the third surface. A first liner panel may be provided that is directed into the first laterally opening receptacle. The first liner panel has a flat surface facing into the cargo storage space that is substantially co-planer with the fourth surface.

The panels may be made from aluminum, with the reinforcement plates made from steel.

The bodies of the side post assemblies may also be made from steel.

The cargo container may further include a wheeled carriage beneath the floor.

The cargo container may be provided in combination with a powered towing component.

In one form, the at least one panel is made from high density polyethylene.

BRIEF DESCRIPTION OF THE DRAWINGS

FIG. 12 is an enlarged, cross-sectional view of the side wall taken along line 12-12 of FIG. 11;

FIG. 13 is a reduced, cross-sectional view as in FIG. 12 and showing a plurality of the side post assemblies with liner panels in place;

DETAILED DESCRIPTION OF THE DRAWINGS

The environment for the present invention is described fully in U.S. Pat. No. 7,066,529, entitled "Cargo Carrying Container With Peripheral Wall Structure Incorporating A Corrugated Sheet", which is incorporated herein by reference.

Figure 1:
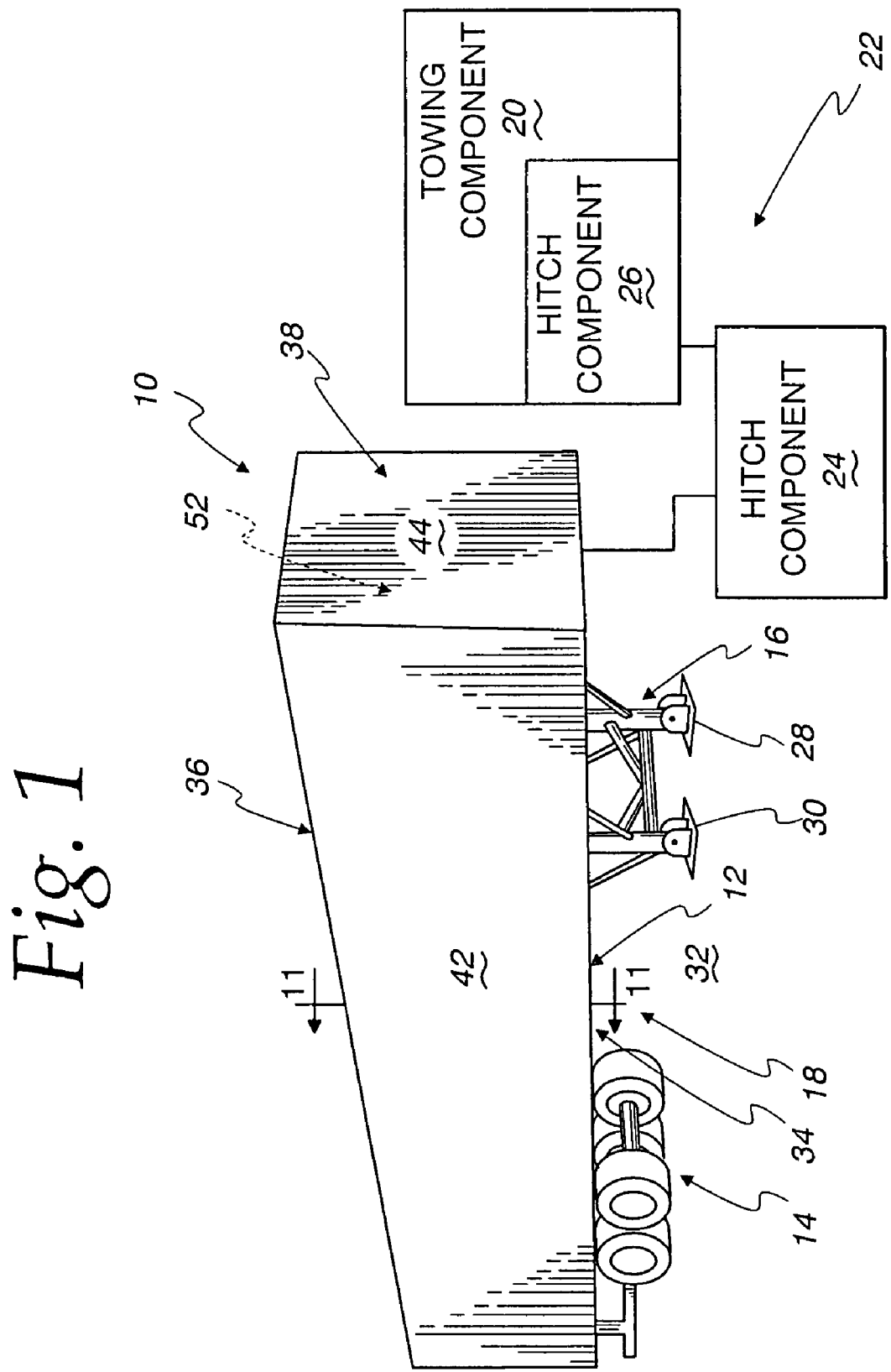
FIG. 1 is a front and side perspective view of a semi-trailer/van incorporating a cargo container with a peripheral wall assembly and connected to a towing component depicted in a schematic form, according to the present invention.
Figure 2:
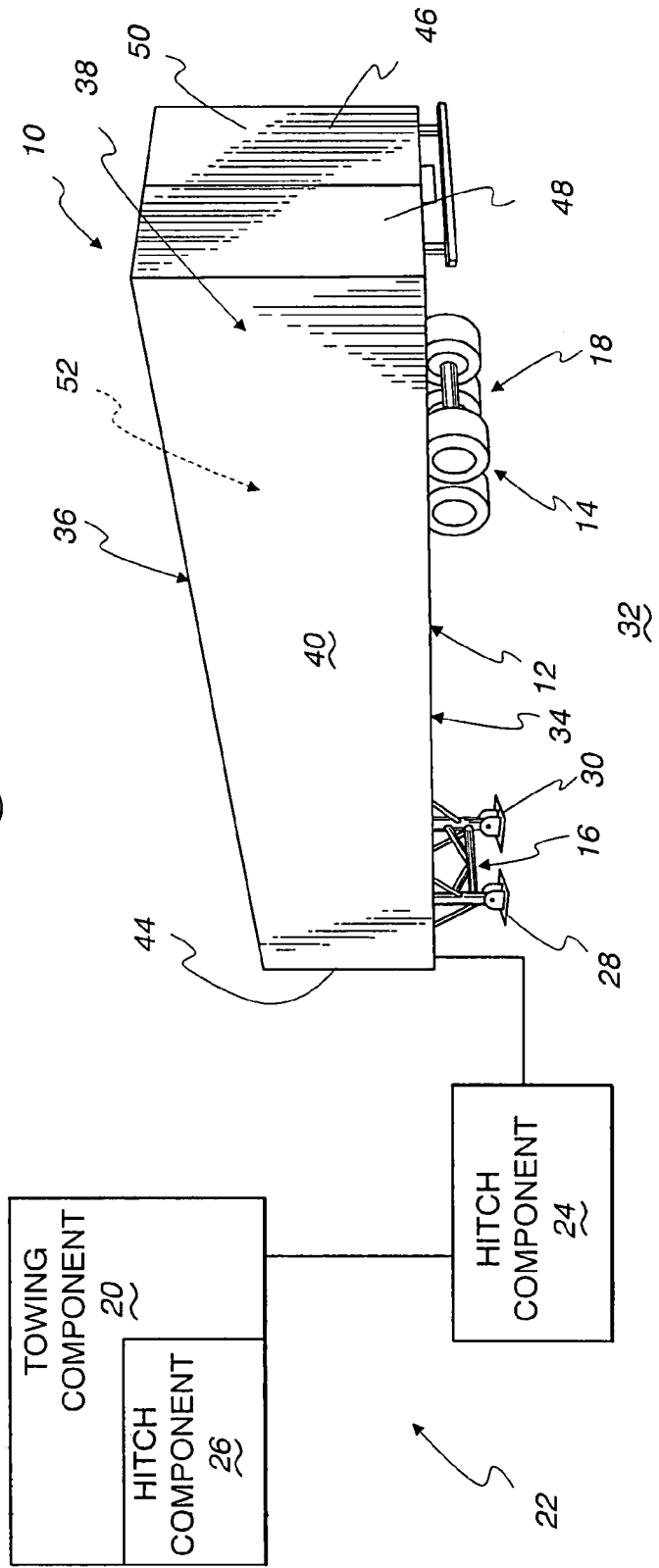
FIG. 2 is a perspective view of the semi-trailer/van and towing component in FIG. 1 taken from the rear and the side opposite that in FIG. 1.
Figure 3:
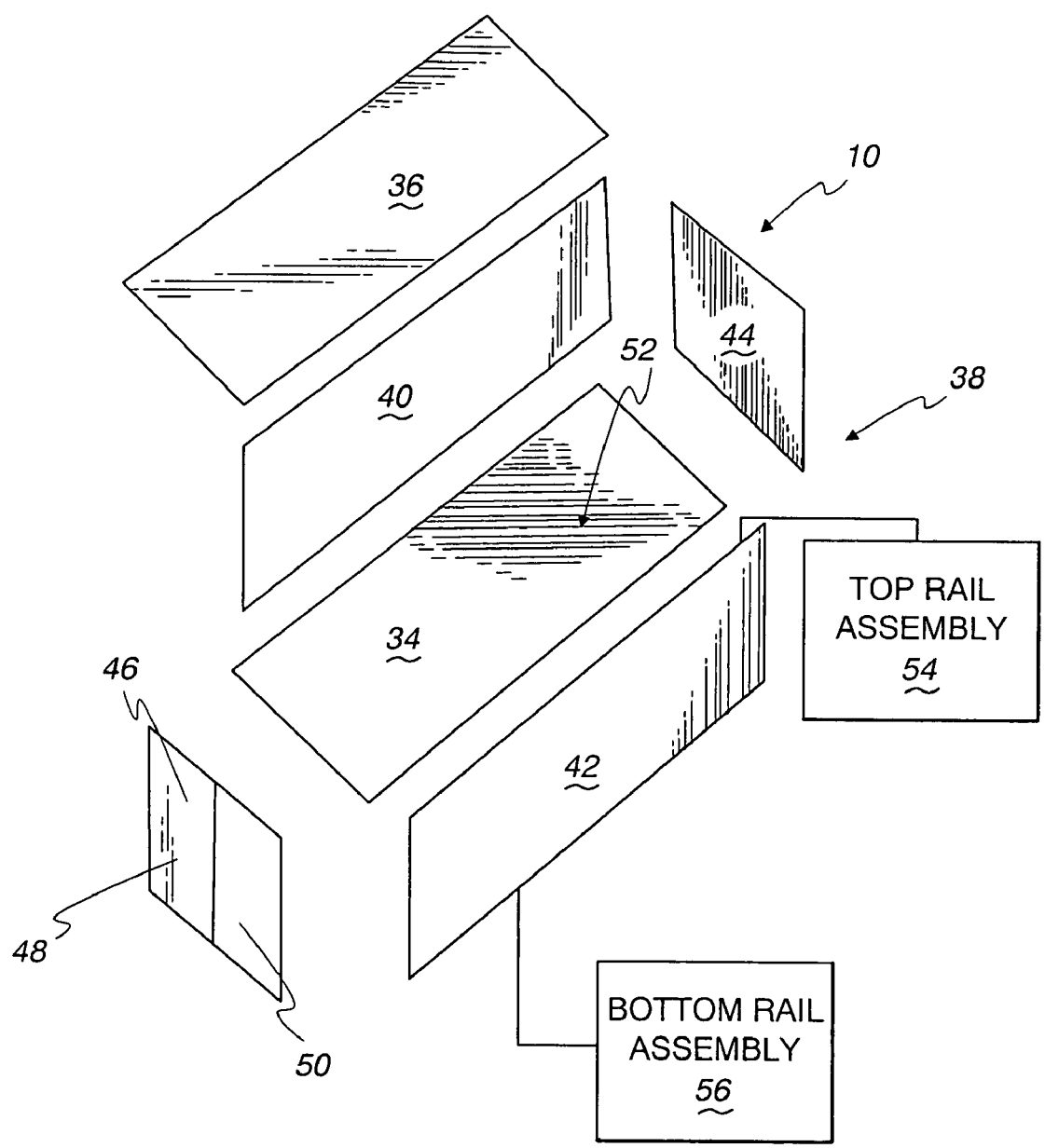
FIG. 3. is an exploded, schematic, perspective view of the cargo container on the semi-trailer/van in FIGS. 1 and 2 and showing the peripheral wall assembly constructed with spaced side walls, a front wall, and a rear wall.

Referring initially to FIGS. 1-3, one form of cargo container, according to the present invention, is shown at 10. In FIGS. 1 and 2, the cargo container 10 is integrated into a chassis 12 consisting of an aft, tandem wheel carriage at 14, and a fore landing gear at 16. The combined cargo container 10 and chassis 12, shown at 18, are commonly referred to as a semi-trailer/van.

The semi-trailer/van 18 is conventionally transported in an over-the-road application by a towing component 20, commonly referred to as a truck tractor or trailer/cab. The towing component 20 is releasably connectable to the cargo container 10 through a hitch assembly at 22, consisting of joinable hitch components 24, 26, respectively on the semi-trailer/van 18 and towing component 20. With the semi-trailer/van 18 separated from the towing component 20, support legs 28, 30 bear on an underlying support surface 32 to maintain the semi-trailer/van 18 in the operative orientation shown in FIGS. 1 and 2.

The cargo container 10 is made up of three different assemblies: a) a floor assembly 34; b) a roof assembly 36; and c) a peripheral wall structure 38. The peripheral wall structure 38 in turn is defined by spaced side walls 40, 42, a front wall 44, and a rear wall 46. The rear wall 46 includes hinged doors 48, 50, which can be opened and closed to selectively permit and block access to a cargo storage space at 52, bounded cooperatively by the floor assembly 34, roof assembly 36, side walls 40, 42, front wall 44, and rear wall 46.

The exemplary side wall 42 has a top rail assembly 54 and a bottom rail assembly 56 through which the side wall 42 is connected respectively to the roof assembly 36 and floor assembly 34. Like rail assemblies (not shown) can be used to connect each of the side wall 40, front wall 44, and rear wall 46 to the roof assembly 36 and floor assembly 34.

Figure 4:
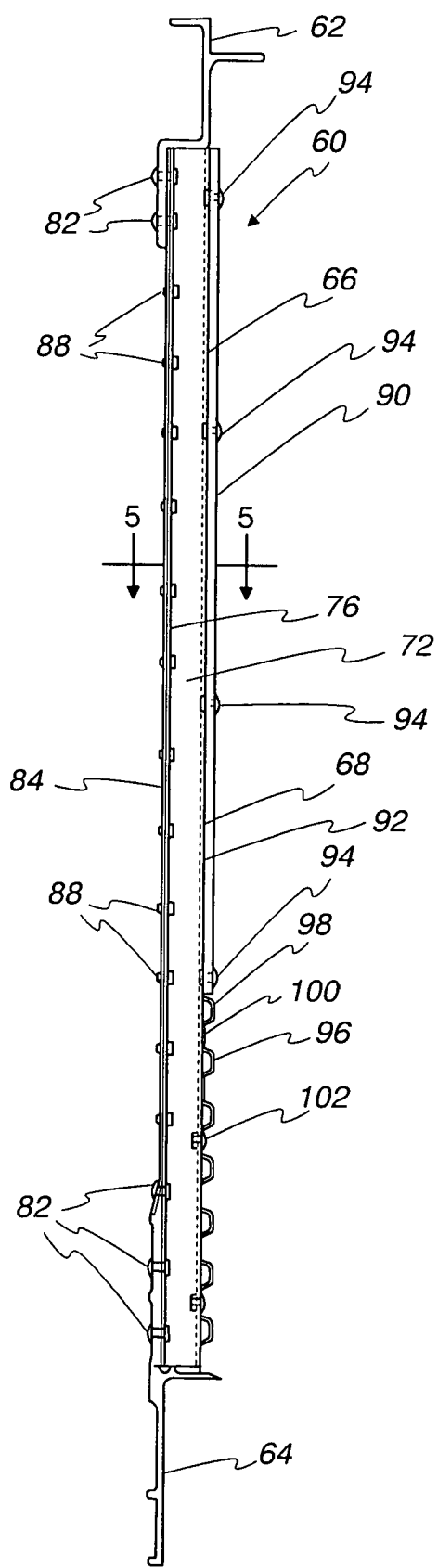
FIG. 4 is a vertical, cross-sectional view of a conventional side wall, as on a semi-trailer/van of the type shown in FIGS. 1 and 2.
Figure 5:
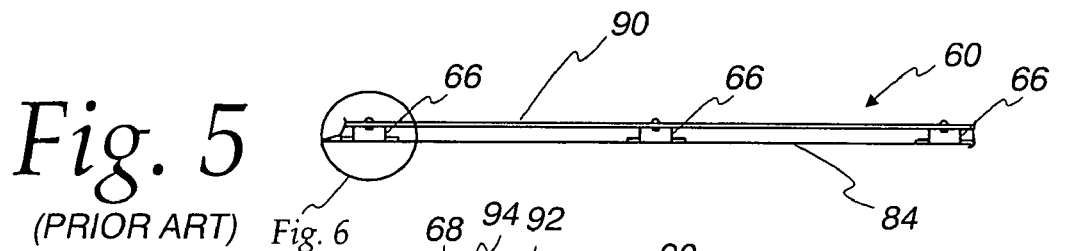
FIG. 5 is a reduced, cross-sectional view of the side wall taken along line 5-5 of FIG. 4 and showing a series of stiffeners/side post assemblies connected to internal and external panels.
Figure 6:
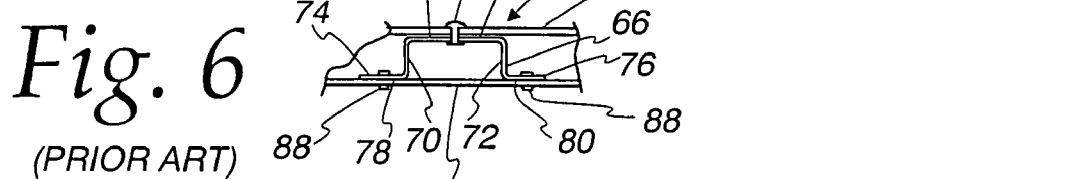
FIG. 6 is an enlarged view from the perspective of FIG. 5 and showing the connection of one of the conventional stiffeners/side post assemblies to internal and external panels.

Referring now to FIGS. 4-6, one conventional construction for a side wall, corresponding to the side wall 42, is shown at 60. The side wall 60 has top and bottom rail assemblies 62, 64 which respectively connect the side wall 60 to roof and floor assemblies (not shown). A plurality of elongate, stiffeners/side post assemblies 66 extend vertically between, and connect to, each of the top and bottom rail assemblies 62, 64.

In this embodiment, each stiffener/side post assembly 66 has a U- or hat-shaped configuration with a base 68 from which spaced legs 70, 72 project. The legs 70, 72 have outturned flanges 74, 76, respectively, which have coplanar, flat surfaces 78, 80, respectively. Mechanical fasteners 82 extend through the flanges 74, 76 and each of the top rail assembly 62 and bottom rail assembly 64 to operatively connect each stiffener/side post assembly 66 to the top rail assembly 62 and bottom rail assembly 64. As noted in the Background portion herein, the spacing of the stiffeners/side post assemblies 66 is dictated by the particular loading that is anticipated for the side wall 60.

External panels 84 are joined edge-to-edge and span the surfaces 78, 80 to define the entire external "skin" on the side wall 60. The external panels 84 are maintained in place by fasteners 88 extending through the flanges 74, 76 and the external panels 84.

Internal panels 90 are placed against inwardly facing, coplanar surfaces 92 on the bases 68 of the stiffeners/side post assemblies 66. Mechanical fasteners 94 are directed through the internal panels 90 and bases 68 to secure the connection between the internal panels 90 and the stiffeners/side post assemblies 66.

In FIG. 4, an optional scuff liner panel 96 is connected at the bottom of the stiffeners/side post assemblies 66. The scuff liner panel 96 is shown as a corrugated panel with alternating ridges 98 and grooves 100, with lengths that extend generally horizontally. The ridges 98 guide cargo that is advanced thereagainst horizontally within the cargo space bounded by the side wall 60. The corrugated construction also resists damage due to impact as cargo is maneuvered within the space bounded by the side wall 60 as by fork lift trucks, or other mechanisms/vehicles. Mechanical fasteners 102 are directed through the scuff liner panel 96 between ridges 98 and into the stiffeners/side post assemblies 66 to maintain a connection therebetween.

Figure 7:
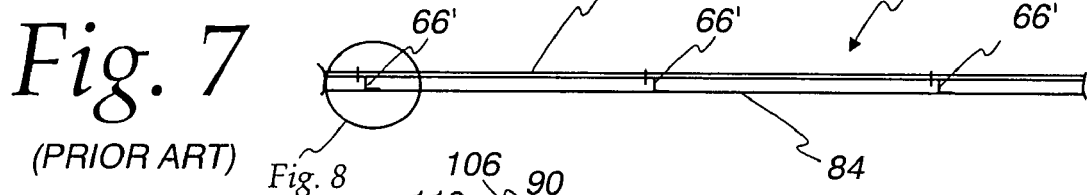
FIG. 7 is a view as in FIG. 5 and showing another form of a conventional side wall.
Figure 8:
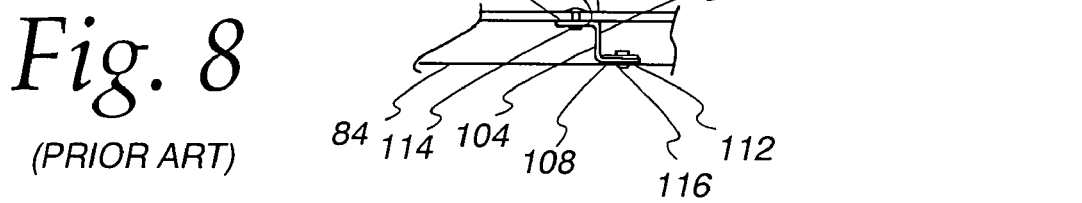
FIG. 8 is a view as in FIG. 6 showing the connection of one of the stiffeners/side post assemblies to internal and external panels on the side wall in FIG. 7.

In FIGS. 7 and 8, another conventional stiffener/side post assembly configuration is shown at 66' on a side wall 60'. The stiffeners/side post assemblies 66' are generally "Z"-shaped with a stem 104 and internal and external legs 106, 108, projecting oppositely away from the stem 104. The legs 106, 108 have oppositely facing, parallel, flat surfaces 110, 112 to which the aforementioned internal and external panels 90, 84, respectively, abut. Mechanical fasteners 114 extend through the legs 106 and internal panels 90 to secure the same. Mechanical fasteners 116 extend through the legs 108 and the external panels 84 to secure the connection thereof.

Figure 9:
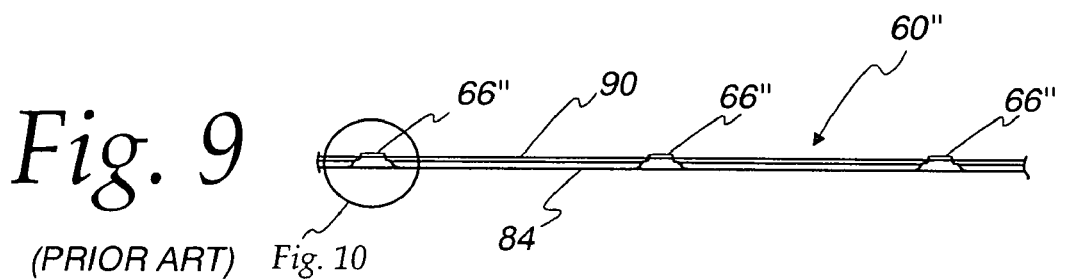
FIG. 9 is a view as in FIGS. 5 and 7 of another form of the conventional side wall.
Figure 10:
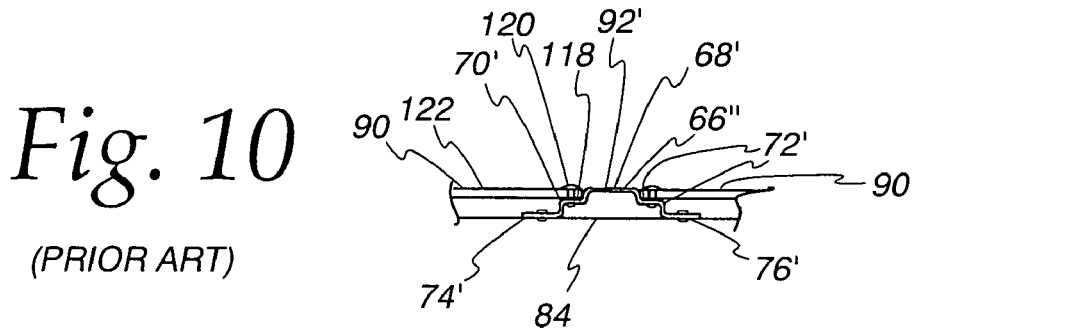
FIG. 10 is a view as in FIGS. 6 and 8 showing the connection of one of the stiffeners/side post assemblies to internal and external panels on the side wall of FIG. 9.
Figure 11:
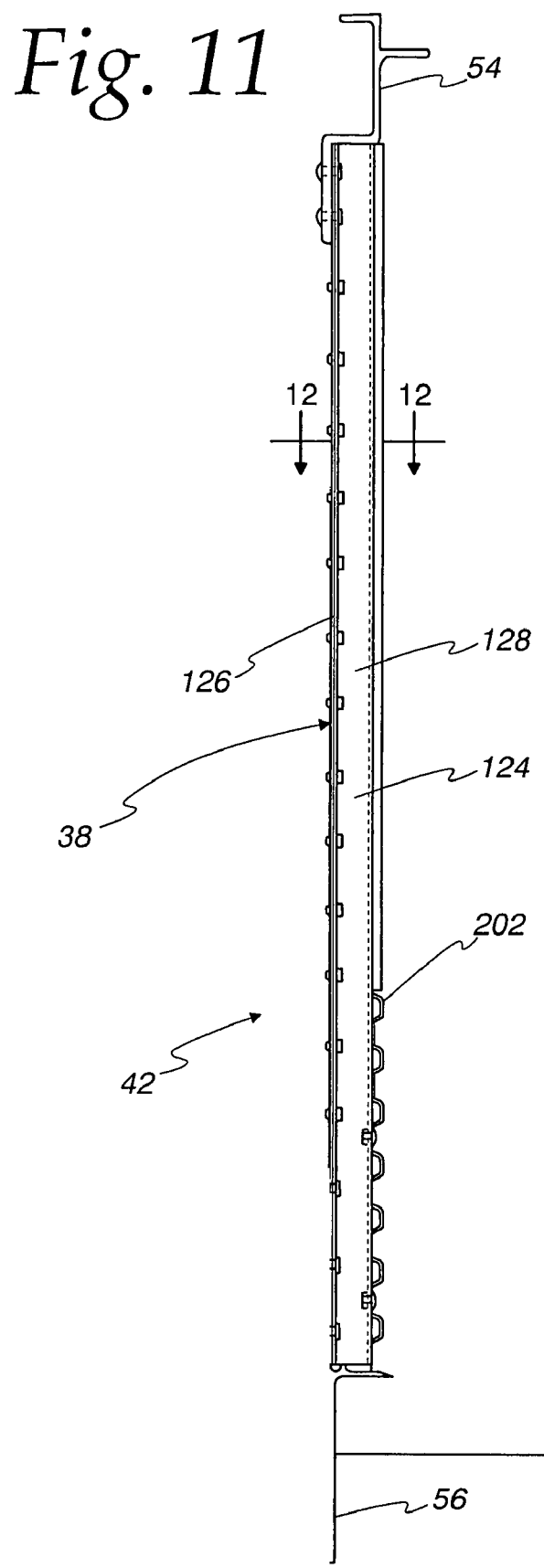
FIG. 11 is a vertical, cross-sectional view of a side wall, incorporating side post assemblies made according to the present invention.
Figure 14:
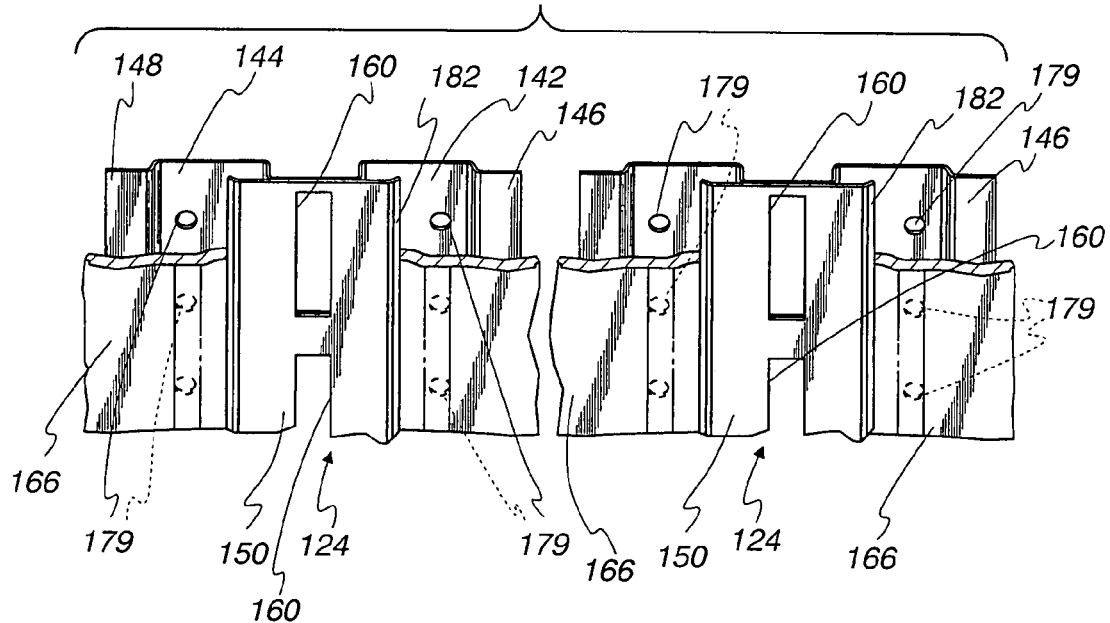
FIG. 14 is an enlarged, fragmentary, elevation view of a pair of side post assemblies taken from the inside of the side wall and with liner panels partially broken away.
Figure 15:
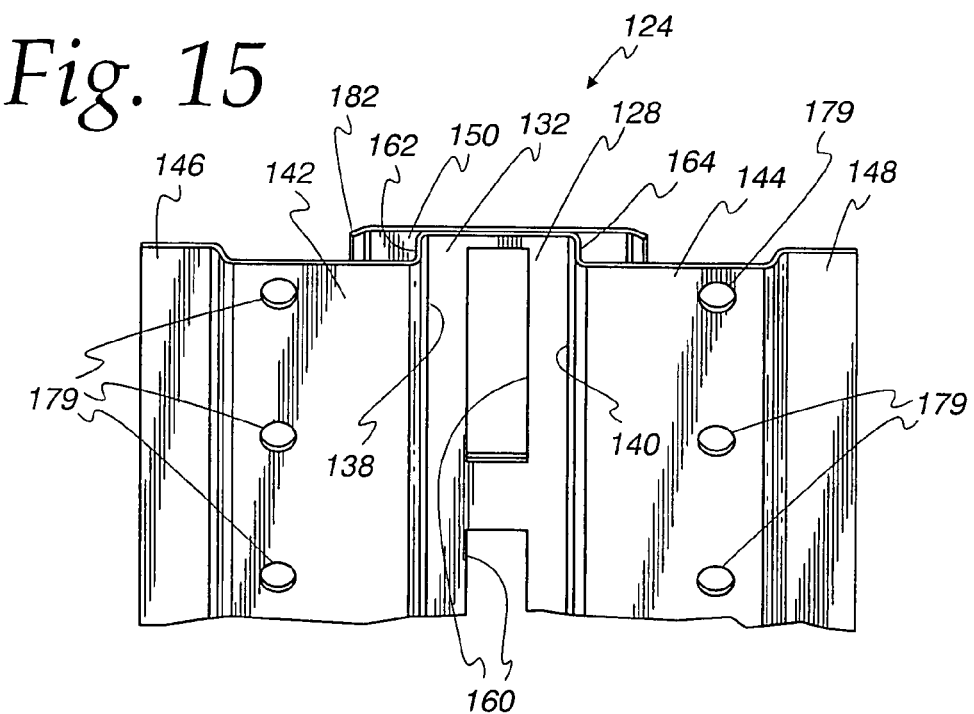
FIG. 15 is an enlarged, fragmentary, perspective view of one of the inventive side post assemblies from the side opposite that in FIG. 14.
Figure 16:
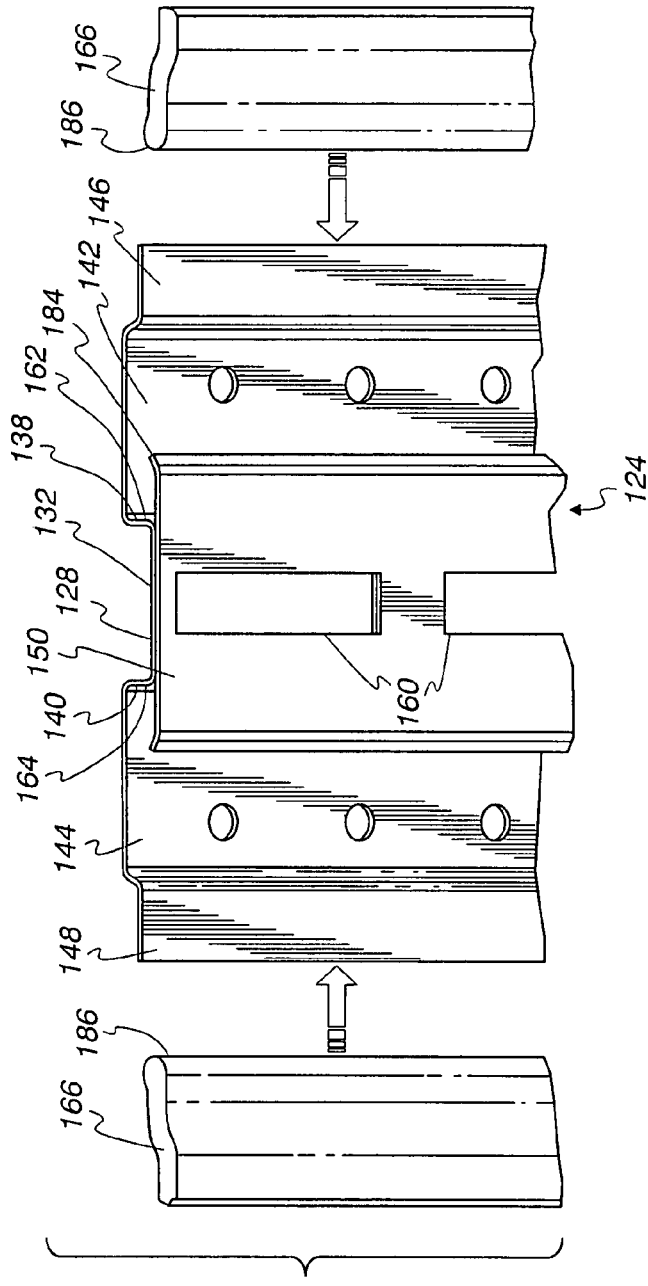
FIG. 16 is an enlarged, fragmentary, perspective view showing the direction of lateral edge portions of side panels into receptacles formed by the side post assemblies.

In FIGS. 9 and 10, a further modified form of conventional stiffener/side post assembly is shown at 66" on a side wall 60". The stiffeners/side post assemblies 66" each has a U-shaped configuration, similar to the stiffeners/side post assemblies 66, with a base 68' and legs 70', 72', projecting from the base 66' and blending into bent, oppositely projecting flanges 74', 76'. The primary difference in this design is that the legs 72', 74' are each Z-shaped rather than extending in a straight manner between the base 66' and flanges 74', 76'. Referring to exemplary leg 70, this Z-shaped configuration produces a flat mounting surface 118 that is offset outwardly from the base 68'. The mounting surface 118 provides a seat for an internal panel 90 which is secured thereagainst, as by mechanical fasteners 120. An internal panel 90 is mounted in similar fashion at the other leg 72'. Preferably, the degree of offset of the mounting surface 118 is selected so that, with the internal panel 90 in place, the inside surface 122 on the internal panel 90 is substantially flush with the base surface 92' on the stiffener/side post assembly 66".

Referring to FIGS. 11 through 19, a preferred form of the cargo container 10, according to the present invention, is shown. The focus herein will be on the specific configuration of the peripheral wall structure 38, including particularly stiffeners/side post assemblies (hereinafter "side post assemblies 124") used to reinforce flat panels 126 that are exposed at the outside of the cargo container 10 on the exemplary side wall 42. The manner in which the side post assemblies 124 and panels 126 are connected to the top rail assembly 54 and bottom rail assembly 56 is not critical to the present invention, and may be accomplished as described in U.S. Pat. No. 7,066, 529, or otherwise in a manner known to those skilled in the art.

Each side post assembly 124 consists of an elongate body 128 that has a length extending in a vertical direction. Each side post assembly 124 has a U-shaped portion at 130 consisting of a base 132 with a width W between laterally spaced first and second ends 134, 136, respectively. First and second legs 138, 140 extend angularly, and preferably orthogonally, from the base 132, respectively at the first and second ends 134, 136. First and second flanges 142, 144 project laterally oppositely, and preferably orthogonally, respectively from the first and second legs 138, 140. The first and second flanges 142, 144 respectively have offset lateral ends 146, 148. The base 132 and first and second legs 138, 140 cooperatively define a "U" shape as viewed in cross section taken transversely to the length of the body 128.

Each side post assembly 124 further includes a reinforcement plate 150 that extends over at least a substantial portion of the width W of the base 132 and is secured thereto so as to reinforce the base 132.

In this embodiment, the base 132, legs 138, 140, and flanges 142, 144 are formed as one piece from metal sheet material. The metal may be aluminum, steel, or other material. More preferably, the material is aluminum or other lighter weight metal.

The base 132 is defined by a layer having inwardly and outwardly facing, generally parallel, flat surfaces 152, 154 between which the material thickness T is defined. Preferably the thickness T is on the order of 16 to 18 gauge.

The reinforcement plate 150 is likewise defined by a layer having inwardly and outwardly facing flat, generally parallel surfaces 156, 158 between which a thickness T1 is defined. The thickness T1 is approximately equal to the distance T, but could be greater to or less than the thickness T. The reinforcement plate 150 is likewise generally made from a flat, metal stock. Preferably, the reinforcement plate 150 is made from steel. This is not a requirement, however.

The purpose of the reinforcement plate 150 is to reinforce primarily the base 132, thereby defining a double thickness through which logistics slots 160 can be formed for attaching various cargo control devices and "double decking" load bars. For this purpose, the reinforcement plate 150 can extend less than the entire width W, but preferably extends the full width W, and in this case extends laterally beyond each of the legs 138, 140 to thereby bound part of first and second laterally oppositely opening first and second receptacles 162, 164, which respectively receive the lateral edges/ends of liner panels 166, as hereinafter described.

Figure 19:
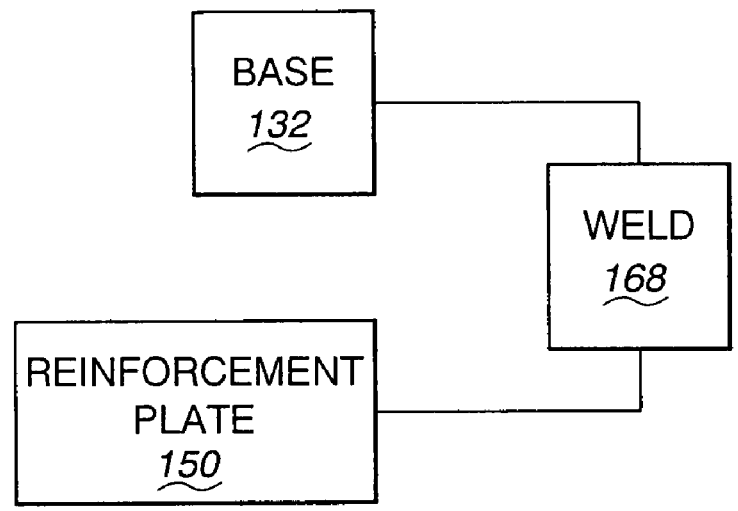
FIG. 19 is a schematic representation as in FIG. 18, wherein a weld is used to maintain the reinforcement plate and base together.

Each reinforcement plate 150 may be joined to its respective base 132 by any means, known to those skilled in the art, so long as the connection is strong enough to cause the reinforcement plate 150 to reinforce the base 132. For example, as shown in FIG. 19, the reinforcement plate 150 may be connected to the base 132 through a weld 168.

Figure 18:
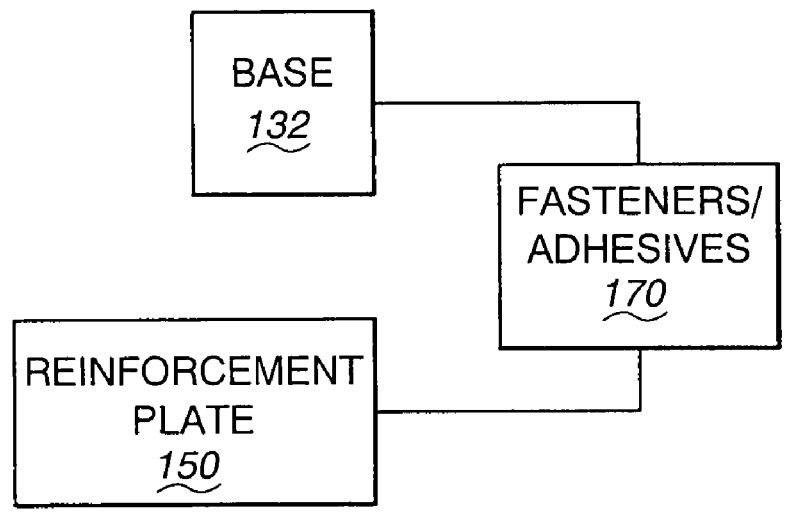
FIG. 18 is a schematic representation of one manner of connecting a reinforcement plate to a base on the inventive side post assemblies using fasteners/adhesives.

Alternatively, as shown in FIG. 18, the reinforcement plate 150 may be secured to the base 132 as by separate fasteners and/or an adhesive 170.

In a preferred form, the flat surface 158 on the reinforcement plate 150 is facially abutted to the flat surface 152 on the base 132 preparatory to securing the reinforcement plate 150 to the base 132. This assures a substantial contact area that produces the desired rigidity for the base 132.

By reason of being a separate part, the reinforcement plate 150 is preferably separable so that it can be replaced in the event that it is damaged in use.

Outside, flat surfaces 172, 174, respectively on the flanges 142, 144, abut to the inside surfaces 176 of the panels 126 that face the cargo storage space 52. The flanges 142, 144 are secured to the panels 126 through rivets 178 through openings 179 in the flanges 142, 144 or by any other means that securely maintains the flanges 142, 144 against the panels 126 at generally regular, predetermined intervals around the periphery of the wall structure 38.

While not a requirement, the reinforcement plates 150 each are shown to be configured to define part of the aforementioned receptacles 162, 164 for the liner panels 166. As seen for the exemplary receptacle 162, the reinforcement plate 150 has an extension 180 laterally beyond the first leg 138 and is bent to define an outward offset 182 adjacent to and terminating at a free end 184.

The lateral end region 186 of the liner panel 166 has a generally rounded free end that blends into an offset 190 that terminates at a main body 192 on the liner panel 166. The lateral end region 186 defines a connecting portion that can be pressed into the receptacle 162 into an assembled position, wherein the free end 184 is spaced from the leg 138 and the lateral end region 186 is captive between a corner 194 at the free end 184 of the reinforcement plate 150 and an inwardly facing surface 196 on the flange 142. In this position, the outwardly facing surface 198 of the liner panel 166 facially abuts to, and is supported upon, an inwardly facing flat surface 200 on the offset end 146 so that a predetermined spacing S of the liner panel 166 is maintained with respect to the panels 126 and the inside surface 201 of the liner panel 166 facing into the cargo storage space 52 is substantially coplanar with the reinforcement plate surface 156.

Figure 17:
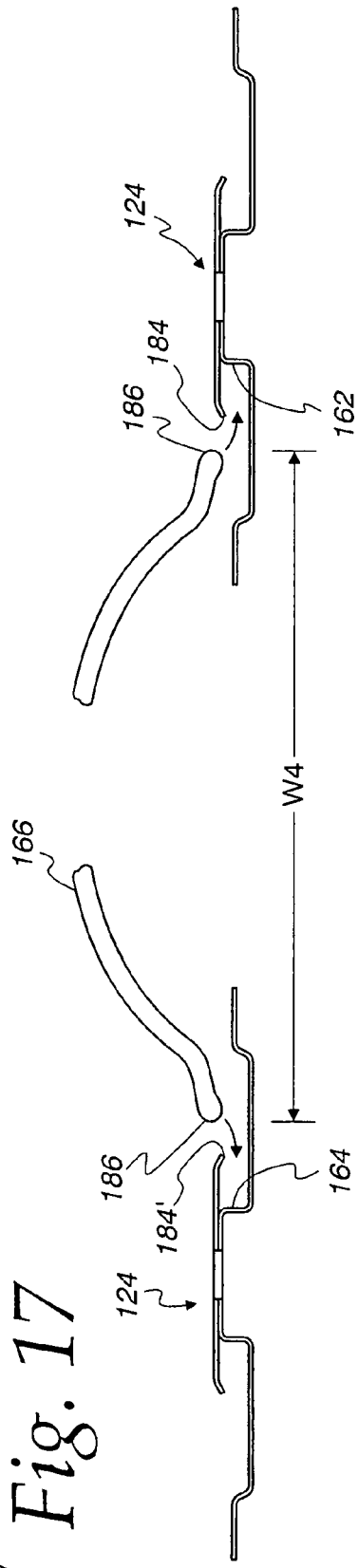
FIG. 17 is a fragmentary, cross-sectional view corresponding to that in FIG. 13; and wherein the liner panel is bowed to allow introduction of its lateral ends into receptacles defined by adjacent side post assemblies.

As seen in FIG. 13, the width W3 of each liner panel 166 is greater than the spacing S1 between the free ends 184, 184' of adjacent side post assemblies 124. Accordingly, as shown in FIG. 17, in a somewhat exaggerated manner, each liner panel 166 must be bowed to produce an effective width W4 that is less than the spacing S1, thereby to allow introduction of the lateral end regions 186 into their respective receptacles 162, 164. Once this occurs, the bowing force can be released to allow the liner panels 166 to relax to a flattened state, whereupon the end regions 186 are biased into their respective receptacles 162, 164. The liner panels 166 are thus frictionally held in their assembled states.

The invention contemplates modifications from the basic structure described above. For example, the flanges 142, 144 and reinforcement plate 150 may have a relationship wherein the liner panels 166 are directly captive between the reinforcement plates 150 and the panels 126.

While the sheet defining the base 132, legs 138, 140, and flanges 142, 144 is shown with a uniform thickness, the thickness may be strategically varied at specific locations. While a single sheet is shown, multiple sheets can be utilized. Similarly, the reinforcement plate 150, while shown with a uniform thickness, may also have strategic thickness variations. While preferably the reinforcement plate 150 is made as one piece, it also can be made using multiple pieces. It may extend over the full length/height of the body 128 or over only a portion of the length/height as needed to provide the desired reinforcement. A plurality of the reinforcement plates 150 may be provided along the length/height of the body 128.

While the liner panels 166 may be made from virtually an unlimited number of different materials, in one preferred form, they are made from high density polyethylene.

The liner panels 166 may extend fully between the top rail assembly 54 and bottom rail assembly 56, with the latter supporting a floor 201. An optional scuff panel 202, of conventional construction, as described in U.S. Pat. No. 7,066,529, may be used.

The exposed external panels 126 may be made from any of a number of different materials, with a range of different thicknesses. As just one example, the panels 126 may be made from 0.050 inch aluminum sheet material. The panels 126 may be butt-joined at their lateral edges or overlapped, with each such construction described in U.S. Pat. No. 7,066,529.

The panels 126 have outside surfaces 206 that face oppositely to the surface 176 any may be directly exposed or covered by another component/layer.

The precise nature of the logistics slots 160 is not critical to the present invention. As an example, the logistic slots 160 may be "Series A"-type logistics slots on 4 inch vertical centers.

The inventive concept can be employed with any type of container having a floor and peripheral wall structure. Aside from that shown in FIGS. 1-3, the container may be used in the environments shown in FIGS. 22-26 in U.S. Pat. No. 7,066,529, with the drawings and associated description incorporated herein by reference.

The foregoing disclosure of specific embodiments is intended to be illustrative of the broad concepts comprehended by the invention.

The invention claimed is:

1. A cargo container comprising:
a floor;
and a peripheral wall structure extending upwardly from the floor and bounding a cargo storage space,
the peripheral wall structure comprising a plurality of side post assemblies, the peripheral wall structure further comprising a plurality of panels each having an inside surface facing the cargo storage space and an oppositely facing outside surface,
each side post assembly comprising a body with a vertically extending length and a "U" shape as viewed in cross section taken transversely to the length of the body,
each side post assembly secured to at least one of the panels and comprising: a) a base with a width between laterally spaced first and second ends; b) first and second legs projecting respectively from the first and second base ends; and c) first and second flanges projecting laterally oppositely respectively from the first and second legs,
the base and first and second legs cooperatively defining the "U" shape,
each side post assembly further comprising a reinforcement plate that extends over a substantial portion of the width of the base and is secured to the base so as to reinforce the base,
wherein the reinforcement plate on each of the side post assemblies projects laterally to beyond the first leg so that the reinforcement plate, first leg, and first flange bound a first laterally opening receptacle for a first liner panel.

2. The cargo container according to claim 1 wherein a logistics slot is formed at a first location on one of the side post assemblies through each of the base and reinforcement plate on the one side post assembly.

3. The cargo container according to claim 1 wherein the first laterally opening receptacle is bounded by at least one of: a) the at least one panel; and b) the first flange.

4. The cargo container according to claim 1 wherein there is a single piece that defines the base, the first and second legs, and the first and second flanges.

5. The cargo container according to claim 4 wherein the single piece is a formed metal sheet.

6. The cargo container according to claim 1 wherein the base comprises a first flat layer with a flat first surface facing into the cargo storage space and a flat second surface facing oppositely to the first surface, the flat first layer having a substantially uniform first thickness, the reinforcement plate comprising a second flat layer with a substantially uniform second thickness, the reinforcement plate having a flat third surface that is facially abutted to the flat first surface.

7. The cargo container according to claim 6 wherein the reinforcement plate projects laterally oppositely to beyond each of the first and second legs to: a) bound in conjunction with the first leg a first laterally opening receptacle for a first liner panel; and b) bound in conjunction with the second leg a second laterally opening receptacle for a second liner panel.

8. The cargo container according to claim 7 wherein the reinforcement plate has laterally spaced ends that are each bent outwardly towards the at least one panel.

9. The cargo container according to claim 6 wherein the first and second thicknesses are each on the order of 16-18 gauge.

10. The cargo container according to claim 1 wherein the first and second flanges are secured to the inside surface of the at least one panel so that the "U" shape opens towards the at least one panel.

11. The cargo container according to claim 1 in combination with a first liner panel that is directed into the first laterally opening receptacle.

12. The cargo container according to claim 1 wherein the reinforcement plate is secured to the base by one of: a) welding; and b) discrete securable fasteners.

13. The cargo container according to claim 11 wherein the first flange is secured to the at least one panel and has a lateral end that is offset from the at least one panel to support a part of the first liner panel a predetermined distance away from the at least one panel.

14. The cargo container according to claim 1 wherein the reinforcement plate extends over a substantial length of the base.

15. The cargo container according to claim 1 wherein the reinforcement plate extends over substantially the entire length of the base.

16. The cargo container according to claim 10 wherein the first and second flanges are secured to the inside surface of the at least one panel by a plurality of discrete securable fasteners.

17. The cargo container according to claim 6 wherein the inside surface of the at least one panel resides substantially in a plane that is substantially parallel to the first, second, and third surfaces.

18. The cargo container according to claim 2 wherein a plurality of vertically spaced logistics slots are formed on one of the side post assemblies.

19. The cargo container according to claim 7 wherein the reinforcement layer has a fourth surface facing oppositely to the third surface and further in combination with a first liner panel that is directed into the first laterally opening receptacle, the first liner panel having a flat surface facing into the cargo storage space that is substantially co-planar with the fourth surface.

20. The cargo container according to claim 1 wherein the panels comprise aluminum and the reinforcement plates comprise steel.

21. The cargo container according to claim 20 wherein the bodies comprise steel.

22. The cargo container according to claim 1 wherein the cargo container further comprises a wheeled carriage beneath the floor.

23. The cargo container according to claim 22 in combination with a powered towing component.

24. The cargo container according to claim 11 wherein the at least one liner panel comprises high density polyethylene.

* * * * *